(12) United States Patent
Pascucci et al.

(10) Patent No.: US 8,935,964 B2
(45) Date of Patent: Jan. 20, 2015

(54) TRANSDUCER FOR AND METHOD OF MEASURING NORMAL FORCE OF A COMPLIANT PIN

(71) Applicant: Tyco Electronics Corporation, Berwyn, PA (US)

(72) Inventors: Vincent Corona Pascucci, Mechanicsburg, PA (US); Michael Anthony Yeomans, Camp Hill, PA (US); Kimberly Lynne Beach, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 80 days.

(21) Appl. No.: 13/717,234

(22) Filed: Dec. 17, 2012

(65) Prior Publication Data
US 2014/0165745 A1 Jun. 19, 2014

(51) Int. Cl.
*G01L 1/22* (2006.01)
(52) U.S. Cl.
CPC .................................... *G01L 1/2243* (2013.01)
USPC ..................................................... 73/862.632

(58) Field of Classification Search
USPC ...................................................... 73/862.632
See application file for complete search history.

(56) References Cited

U.S. PATENT DOCUMENTS

| | | |
|---|---|---|
| 4,380,171 A | 4/1983 | Smith |
| 4,667,512 A | 5/1987 | Buddwalk |
| 4,773,276 A * | 9/1988 | Baruffalo ................... 73/862.01 |
| 5,024,106 A | 6/1991 | Hettinger |
| 5,076,106 A | 12/1991 | Buddwalk |

* cited by examiner

*Primary Examiner* — Lisa Caputo
*Assistant Examiner* — Octavia Hollington

(57) ABSTRACT

A transducer for measuring normal force of a compliant pin includes a fixture having a base. A supporting beam extends from the base. A sensing beam is positioned proximate to the sensing beam and supported at at least one end thereof. The fixture has a slot positioned between the supporting beam and the sensing beam and configured to receive the compliant pin. A strain gauge array is provided on the sensing beam for sensing strain of the sensing beam. The strain of the sensing beam corresponds to normal force imparted on the sensing beam by the compliant pin. The sensing beam is configured to be deformed when the compliant pin is loaded into the slot and the deformation corresponds to strain of the sensing beam configured to be sensed by the strain gauge array.

20 Claims, 3 Drawing Sheets

TRANSDUCER FOR AND METHOD OF MEASURING NORMAL FORCE OF A COMPLIANT PIN

BACKGROUND OF THE INVENTION

The subject matter herein relates generally to a transducer for and method of measuring normal force of a compliant pin.

Currently, there is no method or device to accurately and easily determine force deflection characteristics of compliant pins used to create a solderless termination between electrical contacts and plated vias in printed wiring boards, such as press-fit pins, micro-action pins, eye-of-the-needle pins and the like. Having appropriate normal force at the contact interface between the compliant pin and the plated via of the printed circuit board that receives the pin is desirable to ensure electrical performance. Excessive force can damage the plated via or through hole. Insufficient force can fail to create and maintain a good electrical interface. ANSYS and other modeling methods are used to predict the normal forces, but there is insufficient data to ensure the models are accurate. As designs for the compliant pins become smaller, the normal forces tend to be reduced and compression of the copper in the plated vias becomes a greater factor affecting the final normal force thus causing any inaccuracies in the models to have greater detrimental effects.

A need remains for a device and method of using such device to provide actual measurements of normal force exerted by compliant pins when compressed a known amount. A need remains for a device and method of using such device to evaluate compliant pin designs.

BRIEF DESCRIPTION OF THE INVENTION

In one embodiment, a transducer for measuring normal force of a compliant pin is provided that includes a fixture having a base. A supporting beam extends from the base. A sensing beam is positioned proximate to the supporting beam. The sensing beam is supported at at least one end thereof. The fixture has a slot configured to receive the compliant pin. The slot is positioned between the supporting beam and the sensing beam. A strain gauge array is provided on the sensing beam for sensing strain of the sensing beam. The strain of the sensing beam corresponds to normal force imparted on the sensing beam by the compliant pin. The sensing beam is configured to be deformed when the compliant pin is loaded into the slot and the deformation corresponds to strain of the sensing beam configured to be sensed by the strain gauge array.

Optionally, the sensing beam may be separated from the supporting beam by a pocket. The sensing beam may be able to deflect away from the supporting beam when the compliant pin is loaded into the slot. The slot may be defined by a supporting beam surface and an opposing sensing beam surface. The slot receives the compliant pin between the supporting beam surface and the sensing beam surface. The sensing beam surface may be pressed away from the supporting beam surface by the compliant pin to cause deformation of the sensing beam. The sensing beam surface and the supporting beam surface may be separated by a separation distance that is less than a width of the compliant pin.

Optionally, the sensing beam may be elongated in a longitudinal direction and the slot may receive the compliant pin in a loading direction transverse to the longitudinal direction. The slot may receive the compliant pin in a loading direction perpendicular to the longitudinal direction. The slot may be approximately centered between the ends of the sensing beam.

Optionally, the sensing beam may be separated from the supporting beam by a pair of channels flanking opposite sides of the sensing beam. The channels may allow the sensing beam to move relative to the supporting beam. The sensing beam may include a top, a bottom, a first side and a second side. The first side may face the supporting beam across a first channel and the second side may face the supporting beam across a second channel. The bottom may face the supporting beam across a pocket. The pocket and first and second channels may allowing the sensing beam to deflect relative to the supporting beam when the compliant pin is pressed into the slot between the supporting beam and the bottom of the sensing beam. The strain gauge array may be coupled to the top to sense strain of the sensing beam induced by deflection of the sensing beam.

Optionally, an output of the strain gauge array may be calibrated to correspond to the normal force of the compliant pin. The deformation of the sensing beam may correspond to a compressed dimension of the compliant pin. The strain gauge array may extend along substantially an entire length of the sensing beam. The sensing beam may have a length at least 10 times longer than an amount of deformation of the sensing beam at the compliant pin.

In another embodiment, a method of measuring normal force of a compliant pin is provided that includes attaching a strain gauge array to a sensing beam. The method includes inserting a compliant pin into a slot formed between the sensing beam and a supporting beam, wherein the compliant pin deforms the sensing beam causing strain in the sensing beam. The method includes measuring strain in the sensing beam using the strain gauge array and converting the sensed strain to a normal force measurement of the compliant pin.

Optionally, the method may include forming a pocket between the supporting beam and the sensing beam that allows the sensing beam to deflect away from the supporting beam when the compliant beam is inserted into the slot between the sensing beam and the supporting beam. The inserting may include inserting the compliant pin into the slot in a loading direction transverse to the strain gauge array.

Optionally, the method may include deforming the compliant pin when the compliant pin is inserted into slot and measuring an amount of deformation of the compliant pin. The method may include determining a force/deflection characteristic of the compliant pin based on the normal force measurement and a deformation measurement of the compliant pin.

Optionally, the method may include removing the compliant pin, inserting a second compliant pin into the slot between the supporting beam and the sensing beam that has a different width as compared to the compliant pin, measuring strain in the sensing beam using the strain gauge array induced by the second compliant pin, converting the sensed strain of the second compliant pin to a normal force measurement of the second compliant pin, and comparing the normal force measurement of the compliant pin with the normal force measurement of the second compliant pin.

DETAILED DESCRIPTION OF THE INVENTION

Figure 1:
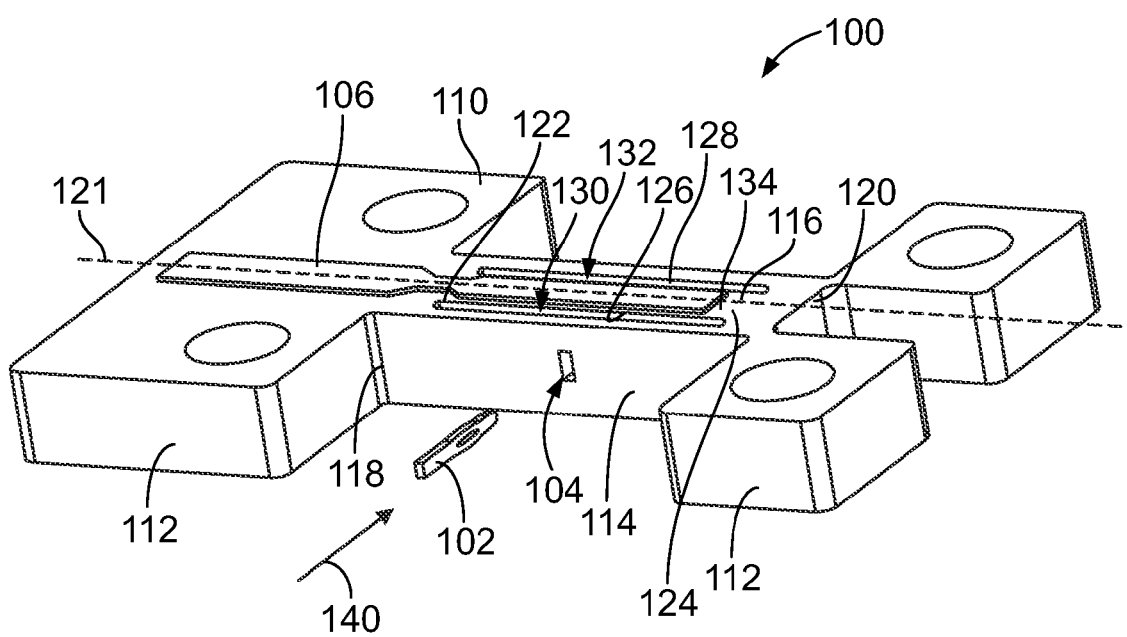
FIG. 1 illustrates a transducer formed in accordance with an exemplary embodiment.

FIG. 1 illustrates a transducer 100 formed in accordance with an exemplary embodiment. The transducer 100 is used for measuring normal force of a compliant pin 102. For example, the transducer 100 is used to determine force deflection characteristics of the compliant pin 102. The transducer 100 is used to determine the normal force at the contact interface of the compliant pin 102, which is used in design considerations of the compliant pin 102, such as the profile, geometric features, the envelope, the form, and the like of the compliant pin 102. The transducer 100 goes beyond modeling methods, such as ANSYS, that are used to predict normal forces of a compliant pin design by directly measuring the force-deflection characteristics of the compliant pin 102 to check and insure that the models are correct and accurate. The compliant pin 102 may be of the type used to create a solderless termination between electrical contacts and plated vias in printed wiring boards, such as press-fit pins, micro-action pins, eye-of-the-needle pins, and the like.

The transducer 100 provides accurate measurements of the normal force exerted by the compliant pin 102 when compressed a known amount. The compression applied will be representative of the deflection expected when the compliant pin 102 is inserted into a plated through hole in a printed circuit board. In an exemplary embodiment, multiple transducers, each having a different sized opening, can be used to determine normal forces on the compliant pin 102 over a range of deflections to fully characterize the behavior of the pin design. The data obtained by the transducers 100 can verify or be used to improve computer models of the behavior of the compliant pin and assess the effectiveness of the design for intended plated through hole dimensions.

The transducer 100 includes a slot 104 of defined dimension to deflect the compliant pin 102 a specific desired amount. The force exerted by the compliant pin when it is deflected will create a strain in a region of the transducer 100. A strain gauge array 106 mounted in such region of the transducer 100 provides an output signal proportional to the strain, deflection or other characteristics in the transducer 100. The strain determined will be used to calculate the final deflection applied to the compliant pin 102. In an exemplary embodiment, the signal is used to determine the normal force the compliant pin 102 is exerting. The strain gauge array 106 may be any type of device used for evaluating strain, deflection or other characteristics associated with strain, such as a foil gauge, a semiconductor strain gauge, a piezoresistor, a pressure film, an optical device, a drop-gage device, and the like.

The transducer 100 includes a fixture 110 used to support the strain gauge array 106. The slot 104 is formed in the fixture 110. The fixture 110 includes a base 112 that may be mounted to another structure. The base 112 may include a right base section and a left base section both configured to be mounted to the structure. The fixture 110 includes a supporting beam 114 extending from the base 112, such as between the right and left base sections. In an exemplary embodiment, the base 112 is provided at both ends 118, 120 of the supporting beam 114. The supporting beam 114 extends between both base sections and is supported at both ends 118, 120 by the base sections. In an exemplary embodiment, the supporting beam 114 is narrower than the base 112. In an exemplary embodiment, the slot 104 is formed in the supporting beam 114. The supporting beam 114 may be cantilevered from one base section in alternative embodiments.

The supporting beam 114 generally surrounds a sensing beam 116. The sensing beam 116 is movable with respect to the supporting beam 114 to allow deflection when evaluating the compliant pin. The strain gauge array 106 extends along the sensing beam 116. The strain gauge array 106 senses strain in the sensing beam 116 when the sensing beam 116 is deflected. In an exemplary embodiment, the strain gauge array 106 changes resistance proportionally to the strain applied and such change in resistance is converted to either a strain measurement or a normal force measurement by the meter or controller attached to the strain gauge array. Conversion by meter or controller may be set during transducer calibration via weights or by other means. Using the output from the transducer of the strain gauge array 106, the meter or controller provides a direct strain measurement or measurement of normal force. The strain gauge array 106 captures the strain effect on the sensing beam 116 and utilizes such to provide a usable output.

The sensing beam 116 extends longitudinally along a longitudinal axis 121 between a first end 122 and a second end 124. The first and second ends 122, 124 are supported by the supporting beam 114 and/or the base 112. Alternatively, the sensing beam 116 may be cantilevered with a free end rather than being supported at both ends 122, 124. In an exemplary embodiment, the supporting beam 114 flanks both sides 126, 128 of the sensing beam 116. Channels 130, 132 are defined between the supporting beam 114 and the sensing beam 116. The channels 130, 132 extend the entire longitudinal length of the sensing beam 116. The channels 130, 132 separate the sensing beam 116 from the supporting beam 114 to allow deflection and movement of the sensing beam 116 relative to the supporting beam 114. The strain gauge array 106 extends along a top 134 of the sensing beam 116. In an exemplary embodiment, the strain gauge array 106 extends substantially an entire length of the sensing beam 116.

The compliant pin 102 is configured to be loaded into the slot 104 in a loading direction 140 which is transverse to the longitudinal direction 121. Optionally, the loading direction 140 may be perpendicular to the longitudinal direction 121. The loading direction 140 may be perpendicular to the normal force of the compliant pin 102.

Figure 2:
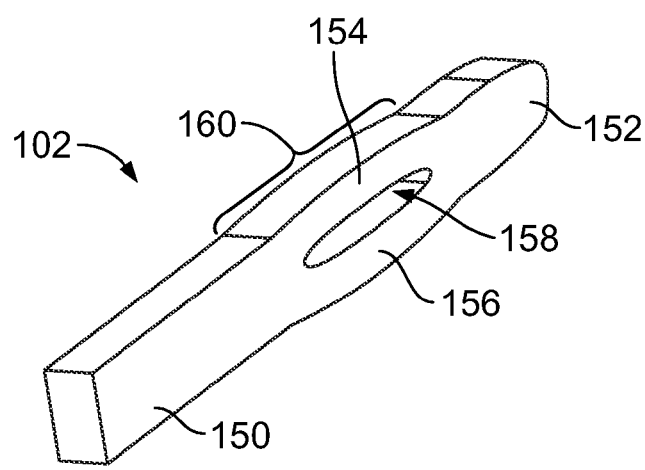
FIG. 2 is a perspective view of a compliant pin to be evaluated by the transducer.

FIG. 2 is a perspective view of the compliant pin 102 formed in accordance with an exemplary embodiment. The compliant pin 102 includes a neck 150 and an insertion tip 152 opposite the neck 150. The neck 150 may extend from any contact structure, such as a signal contact, a ground contact, a ground shield, or another structure.

The compliant pin 102 includes legs 154, 156 extending between the neck 150 and the insertion tip 152. The legs 154, 156 are bent so the legs 154, 156 outwardly protrude from the neck 150 in opposing directions. For example, the legs 154, 156 include arcuate shapes that are arched in different directions from the neck 150. The arcuate shape of the legs 154, 156 may include a shape that is an approximately smooth arch or shape that includes one or more approximately flat edges or surfaces. An opening 158 is formed between the legs 154, 156. The legs 154, 156 extend on opposites sides of the opening 158. The legs 154, 156 and the opening 158 define a compliant region 160 of the compliant pin 102. The compliant pin 102 is wider in the compliant region 160 than along the neck 150 or the insertion tip 152. A form and profile of the compliant region 160 is designed to achieve mechanical and electrical characteristics when mated to a printed circuit board, and the mechanical characteristics, such as the normal force and deflection, are evaluated using the transducer 100.

The legs 154, 156 may be compressed into the opening 158 during insertion of the compliant pin 102 into a corresponding via of the printed circuit board. Such compression of the legs 154, 156 impart an outward normal force against the via in the printed circuit board to ensure electrical contact between the compliant pin 102 and the printed circuit board. Similarly, when used in the transducer 100, the legs 154, 156 impart a normal force against the transducer 100, which may be measurable for evaluating the design and profile of the compliant pin 102.

Figure 3:
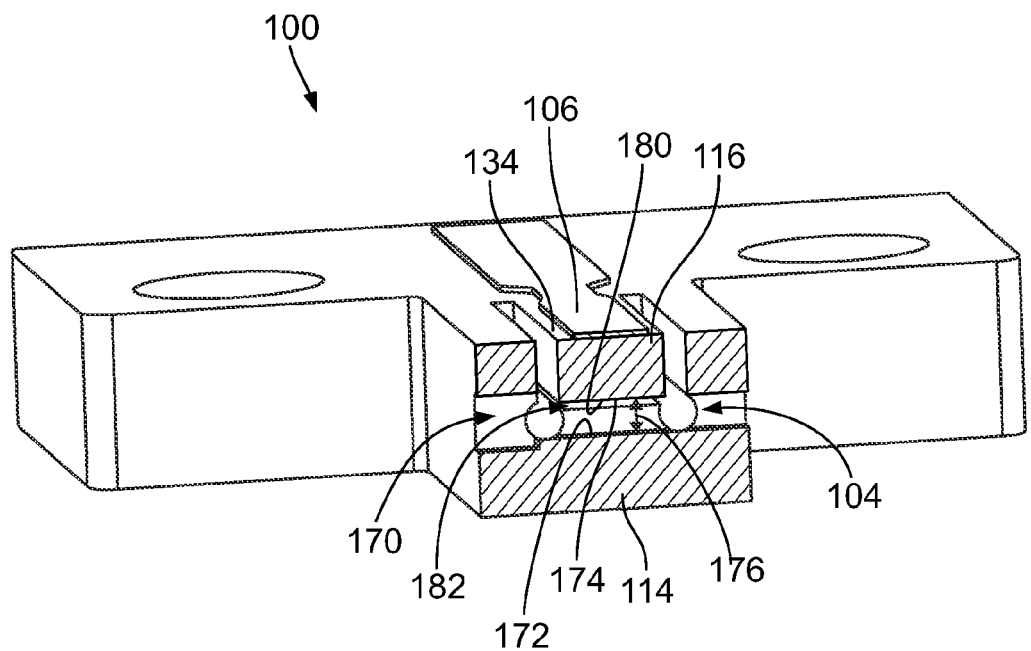
FIG. 3 is a partial sectional view of the transducer.

FIG. 3 is a partial sectional view of the transducer 100 taken along the slot 104. The slot 104 extends through the supporting beam 114 and is configured to receive the compliant pin 102 (shown in FIG. 2). The slot 104 includes an entryway 170 at a side of the supporting beam 114 that receives the compliant pin 102. The entryway 170 is an area of increased height as compared to other areas of the slot 104. The entryway 170 allows insertion of the compliant pin 102 without compressing the compliant pin 102.

Within the transducer 100, the slot 104 is defined at a bottom by a supporting beam surface 172 of the supporting beam 114 and at a top by a sensing beam surface 174 of the sensing beam 116. The sensing beam surface 174 opposes the supporting beam surface 172 across the slot 104. The slot 104 receives the compliant pin 102 between the supporting beam surface 172 and the sensing beam surface 174.

During application, the sensing beam surface 174 is pressed away from the supporting beam surface 172 by the compliant pin 102 to cause deformation of the sensing beam 116, which is measured via resistance change in the strain gauge array 106. The supporting beam surface 172 and sensing beam surface 174 are separated by a separation distance 176. The separation distance 176 is less than the width of the compliant pin 102 between the outer edges of the legs 154, 156 (both shown in FIG. 2). The separation distance 176 is increased when the compliant pin is loaded into the slot 104. Optionally, another transducer may be provided having a slot with a different separation distance. Inserting the compliant pin 102 into the other transducer allows evaluation of the design and profile of the compliant pin 102 with a different amount of compression.

In an exemplary embodiment, the sensing beam 116 includes a bottom 180 opposite the top 134. The bottom 180 includes the sensing beam surface 174. The bottom 180 faces the supporting beam 114 across a pocket 182. The sensing beam 116 is separated from the supporting beam 114 by the pocket 182, which allows the sensing beam 116 to deflect when the compliant pin 102 is loaded into the slot 104. The volume of the pocket 182 may increase when the compliant pin 102 is loaded into the slot 104.

Figure 4:
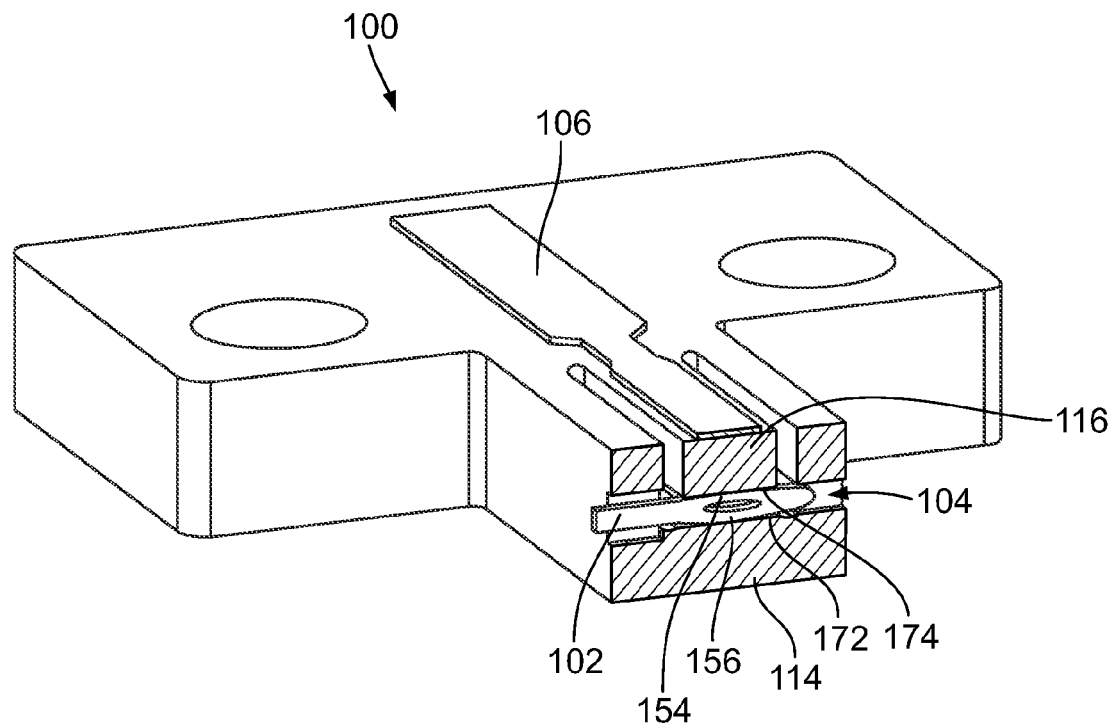
FIG. 4 is a partial sectional view of the transducer showing the compliant pin loaded into a slot of the transducer.

FIG. 4 is a partial sectional view of the transducer 100 showing the compliant pin 102 loaded into the slot 104. When the compliant pin is loaded into the slot 104, the sensing beam 116 is deflected away from the supporting beam 114. Deflection of the sensing beam 116 causes strain in the sensing beam which may be sensed by the strain gauge array 106. The sensed strain in the sensing beam 116 corresponds to the normal force imparted on the sensing beam 116 by the compliant pin 102.

When the compliant pin 102 is loaded into the slot 104, the legs 154, 156 of the compliant pin 102 are deformed causing the compliant pin 102 to press against the sensing beam surface 174 and the supporting beam surface 172. The supporting beam surface 172 remains stationary while the sensing beam surface 174 is able to deflect outward. Having the compliant pin 102 press against the sensing beam 116 causes strain in the sensing beam 116, which is sensed by the strain gauge array 106.

The strain gauge array 106 may be coupled to a monitor or computer that converts the sensed strain to a normal force measurement of the compliant pin 102. The monitor may determine a force deflection characteristic of the compliant pin 102 based on the normal force measurement and a deformation measurement of the compliant pin 102.

Figure 5:
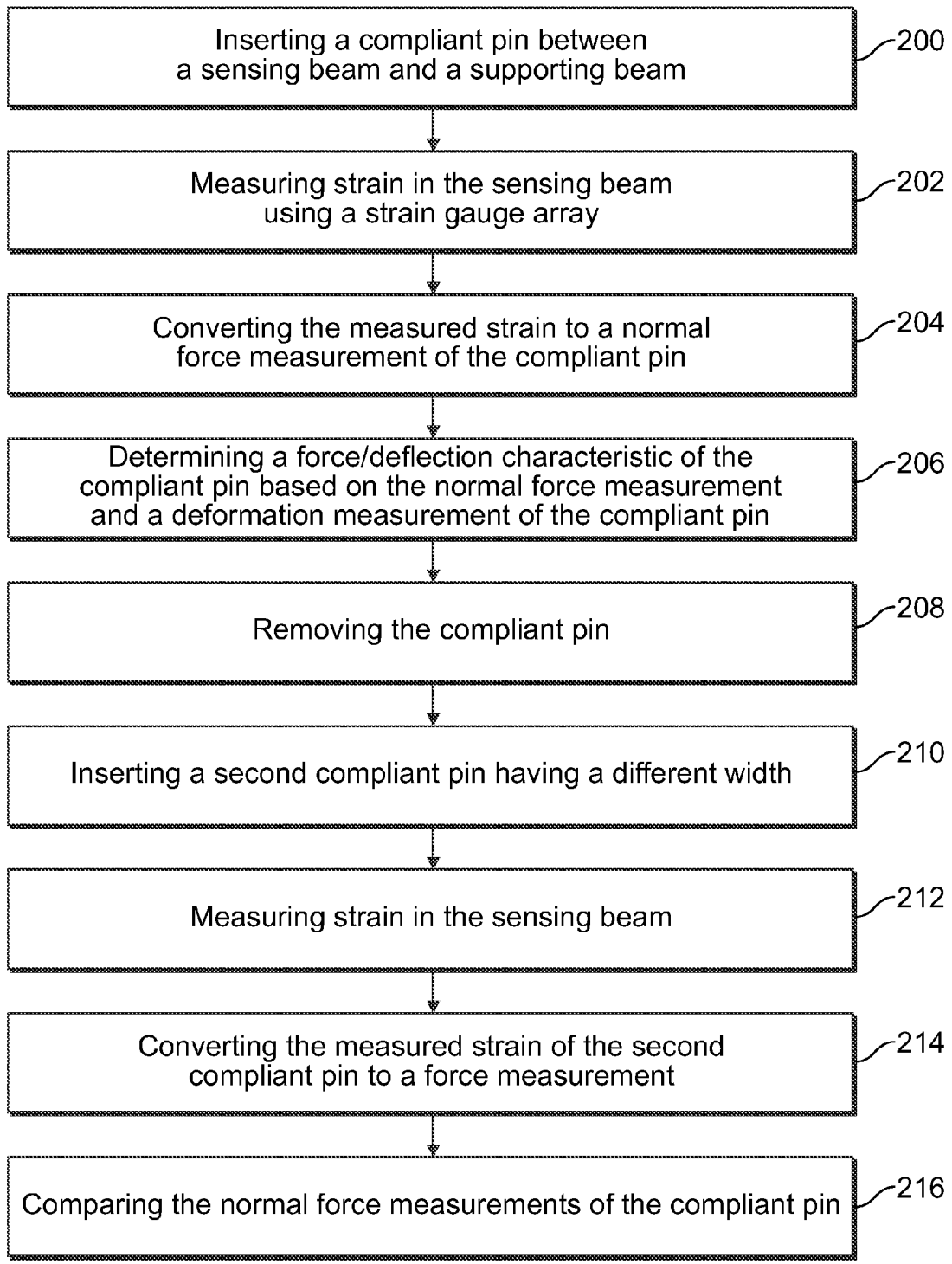
FIG. 5 illustrates a method of measuring normal force of a compliant pin.

FIG. 5 illustrates a method of measuring normal force of a compliant pin. The method includes inserting 200 a compliant pin into a slot formed between the sensing beam and a supporting beam. The slot is narrower than the compliant pin thus causing the compliant pin to compress within the slot and deform the sensing beam. Deformation of the sensing beam causes strain in the sensing beam.

The method includes measuring 202 strain in the sensing beam using a strain gauge array. The strain gauge array may span across or along the sensing beam. The strain gauge array may be coupled to a monitor or computer that analyzes the output from the strain gauge array.

The method includes converting 204 the sensed strain to a normal force measurement of the compliant pin. The monitor or computer may determine the normal force measurement based on the output of the strain gauge array. The system may be calibrated to correspond strain measurements with normal force measurements. The system may determine an amount of deformation of the compliant pin based on the strain measurement and/or the normal force measurement. The method includes determining 206 a force/deflection characteristic of the compliant pin based on the normal force measurement and/or the deformation measurement of the compliant pin.

Optionally, the method may include removing 208 the compliant pin and inserting 210 a second compliant pin into the slot between the supporting beam and the sensing beam that has a different width as compared to the compliant pin. The method may include measuring 212 strain in the sensing beam using the strain gauge array induced by the second compliant pin and converting 214 the sensed strain of the second compliant pin to a normal force measurement of the second compliant pin. The method may include comparing 216 the normal force measurement of the compliant pin with the normal force measurement of the second compliant pin. Different profile designs of compliant pins may be tested and analyzed with the slot of known dimension and thus compared.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A transducer for measuring normal force of a compliant pin, the transducer comprising:
a fixture having a base, a supporting beam extending from the base and a sensing beam proximate to the supporting beam, the sensing beam being supported at at least one end thereof, the fixture having a slot configured to receive the compliant pin, the slot being positioned between the supporting beam and the sensing beam; and
a strain gauge array on the sensing beam, the strain gauge array sensing strain of the sensing beam, the strain of the sensing beam corresponding to normal force imparted on the sensing beam by the compliant pin;
wherein the sensing beam is configured to be deformed and spread apart from the supporting beam when the compliant pin is loaded into the slot, the deformation corresponding to strain of the sensing beam configured to be sensed by the strain gauge array.

2. The transducer of claim 1, wherein the sensing beam is separated from the supporting beam by a pocket, the sensing beam being able to deflect away from the supporting beam when the compliant pin is loaded into the slot.

3. The transducer of claim 1, wherein the slot is defined by a supporting beam surface and an opposing sensing beam surface, the slot receiving the compliant pin between the supporting beam surface and the sensing beam surface, the sensing beam surface being pressed away from the supporting beam surface by the compliant pin to cause deformation of the sensing beam.

4. The transducer of claim 3, wherein the sensing beam surface and the supporting beam surface are separated by a separation distance, the separation distance being less than a width of the compliant pin.

5. The transducer of claim 1, wherein the sensing beam is elongated in a longitudinal direction, the slot receiving the compliant pin in a loading direction transverse to the longitudinal direction.

6. The transducer of claim 1 wherein the sensing beam is elongated in a longitudinal direction, the slot receiving the compliant pin in a loading direction perpendicular to the longitudinal direction.

7. The transducer of claim 1, wherein the sensing beam is elongated in a longitudinal direction between the ends thereof, the slot being approximately centered between the ends of the sensing beam.

8. The transducer of claim 1, wherein the sensing beam is separated from the supporting beam by a pair of channels flanking opposite sides of the sensing beam, the channels allow the sensing beam to move relative to the supporting beam.

9. The transducer of claim 1, wherein the sensing beam includes a top, a bottom, a first side and a second side, the first side facing the supporting beam across a first channel, the second side facing the supporting beam across a second channel, the bottom facing the supporting beam across a pocket, the pocket and first and second channels allowing the sensing beam to deflect relative to the supporting beam when the compliant pin is pressed into the slot between the supporting beam and the bottom of the sensing beam, the strain gauge array being coupled to the top to sense strain of the sensing beam induced by deflection of the sensing beam.

10. The transducer of claim 1, wherein an output of the strain gauge array is calibrated to correspond to the normal force of the compliant pin.

11. The transducer of claim 1, wherein the deformation of the sensing beam corresponds to a compressed dimension of the compliant pin.

12. The transducer of claim 1, wherein the strain gauge array extends along substantially an entire length of the sensing beam.

13. The transducer of claim 1, wherein the sensing beam has a length at least 10 times longer than an amount of deformation of the sensing beam at the compliant pin.

14. A method of measuring normal force of a compliant pin, the method comprising:
attaching a strain gauge array to a sensing beam;
inserting a compliant pin into a slot formed between the sensing beam and a supporting beam, the compliant pin deforming the sensing beam and causing the sensing beam to spread apart from the supporting beam causing strain in the sensing beam;
measuring strain in the sensing beam using the strain gauge array; and
converting the sensed strain to a normal force measurement of the compliant pin.

15. The method of claim 14, further comprising forming a pocket between the supporting beam and the sensing beam, the pocket allowing the sensing beam to deflect away from supporting beam when the compliant beam is inserted into the slot between sensing beam and the supporting beam.

16. The method of claim 14, wherein the strain gauge array extends longitudinally along the sensing beam, said inserting a compliant pin comprises inserting a compliant pin into a slot in a loading direction transverse to the strain gauge array.

17. The method of claim 14, further comprising deforming the compliant pin when the compliant pin is inserted into slot and measuring an amount of deformation of the compliant pin.

18. The method of claim 14, further comprising deforming the compliant pin when the compliant pin is inserted into the slot and determining a force/deflection characteristic of the compliant pin based on the normal force measurement and a deformation measurement of the compliant pin.

19. The method of claim 14 further comprising calibrating the strain gauge array to correspond the sensed strain with the normal force measurement.

20. The method of claim 14 further comprising;
removing the compliant pin;
inserting a second compliant pin into the slot between the supporting beam and the sensing beam, the second compliant pin having a different width as compared to the compliant pin;
measuring strain in the sensing beam using the strain gauge array induced by the second compliant pin;
converting the sensed strain of the second compliant pin to a normal force measurement of the second compliant pin; and
comparing the normal force measurement of the compliant pin with the normal force measurement of the second compliant pin.

* * * * *